US012730712B2

(12) United States Patent
Aue et al.

(10) Patent No.: US 12,730,712 B2
(45) Date of Patent: Sep. 8, 2026

(54) METHOD FOR REPAIRING FAULTY MEMORY LOCATIONS OF A MEMORY

(71) Applicant: Robert Bosch GmbH, Stuttgart (DE)

(72) Inventors: Axel Aue, Korntal-Muenchingen (DE); Matthias Schreiber, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/913,449

(22) Filed: Oct. 11, 2024

(65) Prior Publication Data

US 2025/0130893 A1 Apr. 24, 2025

(30) Foreign Application Priority Data

Oct. 23, 2023 (DE) ..................... 10 2023 210 408.3

(51) Int. Cl.
*G06F 11/00* (2006.01)
*G06F 11/10* (2006.01)

(52) U.S. Cl.
CPC ................................ *G06F 11/1044* (2013.01)

(58) Field of Classification Search
CPC ......................... G06F 11/1044; G06F 11/1048
See application file for complete search history.

(56) References Cited

U.S. PATENT DOCUMENTS 3,633,175 A * 1/1972 Harper ................... G11C 29/76 711/108
4,310,901 A * 1/1982 Harding ................... G11C 8/00 714/710
4,506,362 A * 3/1985 Morley ................. G06F 11/106 714/763
6,065,146 A * 5/2000 Bosshart ............. G06F 11/1008 365/222
8,128,383 B2 * 3/2012 Pulliam ................... F04B 47/02 166/105
10,020,822 B2 * 7/2018 Zhang ................... G06F 3/0673
2014/0164820 A1 * 6/2014 Franceschini .......... G11C 29/70 714/6.11
2015/0255164 A1 9/2015 Grant

FOREIGN PATENT DOCUMENTS

DE 10111711 A1 9/2002

* cited by examiner

*Primary Examiner* — Amine Riad
(74) *Attorney, Agent, or Firm* — NORTON ROSE FULBRIGHT US LLP

(57) ABSTRACT

A method for repairing faulty memory locations of a memory while a program from the memory is being executed by a computer. The program controls a technical device. When the program is being executed, addresses of faulty memory locations in the memory and correct values of the faulty memory locations are detected. The program provides time periods for repairing the faulty memory locations. The time periods are selected such that the control of the technical device is not hindered. For the repair, the correct values are written to the faulty memory locations.

6 Claims, 1 Drawing Sheet

METHOD FOR REPAIRING FAULTY MEMORY LOCATIONS OF A MEMORY

FIELD

The present invention is based on a method for repairing faulty memory locations of a memory. This method is performed while a program for controlling a technical device is simultaneously executed from the memory by a computer.

BACKGROUND INFORMATION

Methods for detecting faulty memory locations or memory locations that exhibit a deterioration in the quality of the stored data are described in U.S. Patent Application No. US 2015/0255164 A1.

SUMMARY

The method according to the present invention has an advantage that the faulty memory locations are repaired while a program for controlling a technical device is being executed from the memory by the computer. It is therefore not necessary to provide a separate operating mode in which the memory locations are checked and repaired. The method according to the present invention can thus appear to a user of the computer to be performed simultaneously and does not require any interruption of the normal operation of the computer. This can improve the operational reliability of the computer during the control of a technical device.

Further advantages and improvements result from certain features of the present invention. According to an example embodiment of the present invention, by providing fixed times for the time periods of the repair, the correct functioning of the memory can be firmly planned. By controlling the priority of the time periods for repairing the memory, greater flexibility is achieved with regard to the use of the computer for controlling the technical device and repairing the memory. This allows the available time of the computer to be used flexibly. Faulty memory locations can be detected by means of error-detecting codes, and the correct values can be ascertained by means of error-correcting codes. However, this requires a correspondingly higher number of bits for protecting the memory locations. Alternatively, methods that use physical properties of the memory locations may be used. For this purpose, it is however necessary to provide appropriate hardware for evaluating the physical properties of the memory locations. The memory locations are checked particularly easily if the memory locations are already being read for processing the program for controlling the technical device. In order to ensure that all areas of the memory are checked, further time periods, which are used only to ascertain faulty memory locations, may be provided. This ensures that all areas of the memory are reliably checked.

BRIEF DESCRIPTION OF THE DRAWINGS

Exemplary embodiments of the present invention are shown in the figures and explained in more detail in the following description.

DETAILED DESCRIPTION OF EXAMPLE EMBODIMENTS

Figure 1:
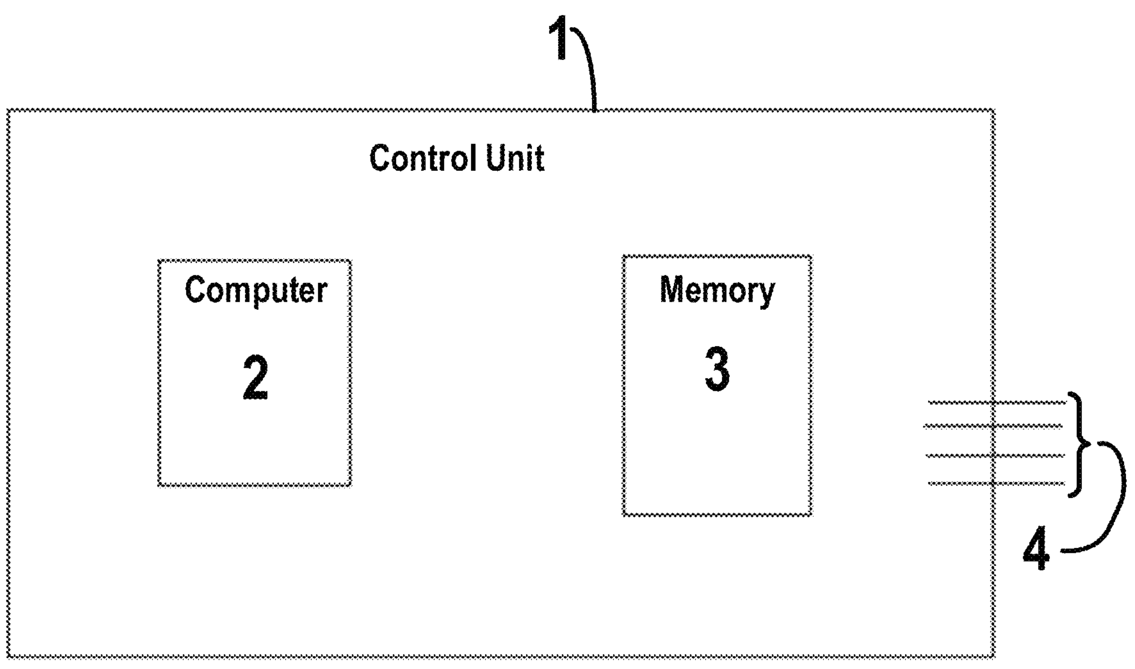
FIG. 1 shows a computer and a memory for a method according to an example embodiment of the present invention.

FIG. 1 schematically shows a control unit 1 with a computer 2 and a memory 3. The control unit 1 has a plurality of output lines and input lines 4 through which the control unit 1 controls an external technical device or reads in sensor signals from the external technical device. Such a technical device may, for example, be a motor vehicle of which the functions are controlled by the control unit 1.

The control unit 1 realizes a plurality of functions seemingly simultaneously. For this purpose, the computer 2 processes programs that are stored in the memory 3. At any one time, the computer can only process one command of the programs stored in the memory 3. In order nevertheless to process a plurality of tasks seemingly simultaneously, the programs are broken down into individual subprograms and switching between different subprograms is carried out so quickly that they appear to be processed simultaneously.

This form of processing individual program parts is usually referred to as multitasking. Each of these subprograms realizes a different function that appears to be carried out simultaneously. This means that the controlled technical device must tolerate short time intervals or time periods during which no new responses are carried out by the control unit 1. The control of an engine of a motor vehicle can be considered an example of such time intervals. Such an engine typically has a speed of 6000 rpm (revolutions per minute), i.e., 100 rps. In a four-cylinder engine, 200 combustion processes must therefore be controlled per second, i.e., one combustion process every 2.5 ms on average. Between these times at which a combustion process is calculated, other functions can be carried out, such as monitoring and diagnostics of the controlled technical device or of the control unit. This procedure of realizing a variety of different functions by temporarily processing and switching between the functions is typically referred to as multitasking.

The memory 3 shown in FIG. 1 is typically realized by transistors that comprise a gate in which electrical charges can be stored. Depending on the stored electrical charges, the switching behavior of the transistors that form the memory locations is influenced when a voltage is applied to a selection line or address line. However, in this type of bit value storage, errors may occur when the stored charge is changed. The storage reliability depends on the quality of individual insulation layers, which allow a certain loss of charge over time, so that, when a memory cell is read, detecting the value of the bit is impaired. In order to ensure reliable functioning of the control unit 1 over a long time interval, it is therefore necessary to check the memory 3 regularly and, optionally, if errors in a memory cell are detected, to initiate a repair. The repair consists in rewriting the memory location by introducing the correct charge into the gate.

For such a repair, it is first necessary to detect faulty memory cells. One way to detect faulty memory cells is to use error-detecting codes. A particularly simple error-detecting code consists, for example, in providing a parity bit for a certain number of bit values. Using such a simple code, a single bit error can be detected, for example. However, there are other common coding methods that allow bit errors not only to be detected but also to be corrected. By using such error-detecting and error-correcting coding methods of the data in the memory 3, it is thus possible to detect which bit values in the memory 3 are faulty and what the correct value is for the bit of a specific memory location.

Another way of detecting faulty memory locations is to check a physical value that depends on the stored electrical charge, when reading the memory cell. Typically, a reading voltage is applied to the memory cell and it is checked how the memory cell changes the applied voltage. A first voltage value read corresponds to a value of the bit of 0, and a further voltage value read corresponds to the value of the bit of 1. According to the voltage read or a temporal progression of the voltage, it is possible to detect areas in which the value of the bit is still unambiguous and thus reliable, but a deterioration of the storage, i.e., a reduced amount of charge in the gate, is detected. Two different states of the memory location can thus be distinguished, wherein one is classified as reliable and good and the other is classified as reliable but problematic. This state of reliable and problematic can be changed to the state of reliable and good by rewriting the memory location. These methods for detecting a still correct but slightly deteriorated memory location are referred to as "margin read" methods and allow slow deterioration of memory cells to be detected. Such "margin read" methods are described, for example, in patent application US20150255164 A1.

Detecting faulty memory cells can be realized by the computer using different procedures when processing the program. The basis of a particularly simpler method is that, when processing a normal program for controlling the technical device by means of the computer core 2, the data read from the memory 3 are continuously checked by means of an error-detecting and additionally also error-correcting code. If, for example, an incorrect value for a single bit is detected in a memory location, this is corrected by the error-correcting code in such a way that only the corrected data, i.e., error-corrected data, are used for processing the control program by the computing core 2. Furthermore, the address of the incorrect value and the correct value of this faulty memory location are stored at this time. The correct value can then be written into the memory cell either immediately or at a later time, as soon as a corresponding time period for repairing memory locations is available. When using an error-correcting code that can correct a higher number of bit errors, correspondingly more bit errors can also be detected and corrected Alternatively, the computing core 2 can continuously check the memory 3 as to whether individual bit errors are found on the basis of an error-detecting code or on the basis of the "margin read" method described above. For this purpose, in addition to the planned time periods for the repair, further time periods for finding faulty memory locations are provided. These further time periods can also be used as an alternative to the time periods for repair since a repair of a memory location is only carried out if a faulty memory location was previously detected. These two methods for detecting faulty memory locations can also be used together. For the program parts that are regularly processed by the computer, any faulty memory locations are found and repaired through regular processing. For program parts that are rarely used, further time periods can be provided in order to check the memory locations for these program parts regularly as well and to repair them if necessary. Below, multitasking methods are described to show how such continuous checking can be carried out without affecting the simultaneously carried-out control of the technical device.

An important contribution to performing the method for repairing faulty memory locations in a memory is that the detection of faulty memory locations and the actual repair are separated in time. The actual repair consists in programming a specified value into a memory cell, wherein the specified value was previously ascertained as the correct value. However, the identification of faulty memory cells and the storage of the correct value in the memory cell can be separated in time, i.e., the identification and the correction do not have to be carried out in a common method step. This has the result that the individual steps are each very short when considered individually, and that there is therefore no major delay in processing the normal control of the functioning of the technical device. In particular, the repair step, i.e., writing a memory cell with a specified value, can be very short in time and therefore does not result in significant delays in the processing of the program for controlling the technical device.

In principle, two different types of multitasking are possible, here in particular multitasking with controlling a technical system and repairing the memory.

Figure 2:
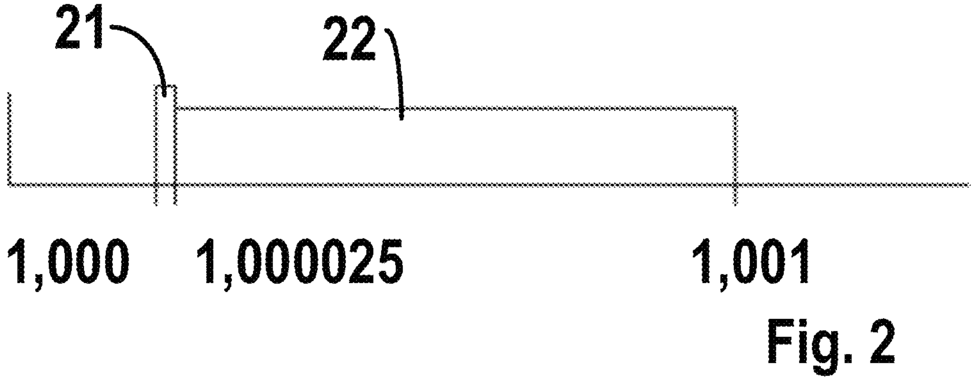
FIG. 2 shows a first method of temporal allocation, according to an example embodiment of the present invention.

A first multitasking method is explained with reference to FIG. 2. In FIG. 2, a time axis and a corresponding occupation of the computing core 2 with subprograms are plotted to the right. It is assumed that there is a fixed distribution of time periods or time intervals for the processing of individual subprograms. The time axis shows a time interval of approximately 1 ms, i.e., between the times 1.000 and 1.001 seconds. A repair of a memory cell, for which a time period of 25 μs is provided, is carried out every full millisecond. That is to say, the repair of a memory cell is carried out in the time period 21 from 1.000 to 1.000025 seconds. Only for this very short time period is a repair of the memory cells carried out, which, due to the shortness of the time, does not result in any significant delays in the processing of the normal program for controlling the technical device. The time period 22 between 1.000025 and 1.001 seconds is entirely available for processing the normal program for controlling the technical device. In this short time period of 25 μs, one correct value can, for example, be written to a memory cell that was previously ascertained as faulty. Alternatively, during this time period, a single memory cell can be identified as faulty and the address of this faulty memory cell and the correct value of the memory cell can be stored. Since only a very short time period for repairing the memory is provided, it will in total take a very long time until a complete check and repair of a memory 3 has been carried out. However, this is not critical if the rate of errors occurring is so low that no multiple errors that cannot be corrected with the error-correcting code used occur during the time period for a complete check, or the correct charge level of an individual memory cell can no longer be ascertained by means of the "margin read" method used.

Figure 3:
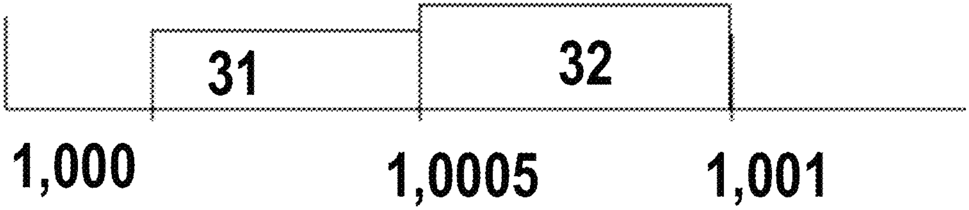
FIG. 3 shows a second method of temporal allocation, according to an example embodiment of the present invention.

A further multitasking method is explained with reference to FIG. 3. Here, it is assumed that the memory 3 contains different program parts, each of which is assigned a different priority. The individual program parts compete for the computing time of the computing core, wherein high-priority program parts prevail over lower-priority program parts. Program parts for controlling the technical device are assigned a high priority, while a program part for repairing faulty memory cells is assigned only a low priority. At time 1.000, a program for calculating the necessary control signals for controlling the technical device is started since this program part has the highest priority at time 1.000. This program part for calculating the necessary control signals for controlling the technical device has a high priority and is therefore processed first by the computing core 2 in comparison with other low-priority program parts. The processing of this program part for controlling the technical device 31 lasts until the time 1.0005 seconds, so that the computing core does not calculate any tasks for controlling the technical device between the times 1.0005 and 1.001 seconds. This time window 32 between 1.0005 and 1.001 seconds can then be used for other low-priority tasks; in particular, a method for repairing faulty memory cells can be performed during this time period. For the overall function of the control unit, the only important question is how quickly switching from processing a low-priority task (repairing memory cells) to a high-priority task (controlling the technical device) can be carried out. If this switching is carried out very quickly, the control of the technical device is not hindered. Even in such a method, a distinction must be made between the identification of faulty memory locations and the repair of the memory locations. With respect to the identification of faulty memory locations, the actual process of identifying the faulty memory locations does not have to be carried out to completion.

It only needs to be ensured that the correct memory locations are again considered during the next identification process.

When repairing the memory locations, i.e., when writing the correct value of the bit to individual memory locations, it is advantageous if the actual storing process is not interrupted in order not to leave a memory location with an incomprehensible or ambiguous value of the stored bit or the stored charge. However, since this process can be completed very quickly, it does not involve a long delay for a high-priority program for controlling the technical device. Even if the time period is not long enough to completely program the memory location, this is acceptable for the system since programming can, for example, continue in the next time period for repairing the memory locations and the technical function can be maintained in the meantime by the error-correcting code despite the faulty memory location since the correction by the error-correcting code of the computing unit provides correct (corrected) contents.

The invention claimed is:

1. A method for repairing faulty memory locations of a memory while a program from the memory is being executed by a computer, wherein the program controls functions of an external electromechanical device distinct from the memory and the computer, the method comprising the following steps:

while executing the program to control the external electromechanical device, detecting addresses of faulty memory locations in the memory and corresponding correct values;

providing, by the program, predetermined cyclically recurring repair time windows that recur at fixed periodic intervals during execution of the program, the repair time windows being scheduled independently of memory-access operations and being interspersed among time windows during which the program controls the functions of the external electromechanical device, wherein the fixed time periods are scheduled such that the repair does not interrupt the control of the functions of the external electromechanical device; and during the repair time windows, repairing the faulty memory locations by overwriting the faulty memory locations with the corresponding correct values.

2. The method according to claim 1, wherein different program parts in the program are assigned different priorities, a high-priority program part interrupts the processing of a lower-priority program part by the computer, and a program part with a time period for repairing the faulty memory locations has a lower priority in comparison with a program part for controlling the external electromechanical device.

3. The method according to claim 1, wherein the memory locations contain information encoded with an error-detecting and error-correcting code, each faulty memory location and a correct value are detected by evaluating the code.

4. The method according to claim 3, wherein, while the program from the memory is being processed by the computer, the faulty memory locations are detected, the repair of the faulty memory locations being delayed from a time of the detection until one of the fixed periodic intervals is reached.

5. The method according to claim 3, wherein the program provides further predetermined time windows, separate from the repair time windows, during which the memory is scanned to detect memory locations.

6. The method according to claim 1, wherein the memory locations are read using a method which indicates a physical property of information stored in a memory location, wherein the physical property is classified: i) as reliable and good or (ii) as reliable and problematic, and the memory locations of which the information was classified as reliable and problematic are changed to a state of reliable and good by storing the information in the memory location again.

* * * * *